United States Patent [19]

Inoue

[11] 4,233,486
[45] Nov. 11, 1980

[54] TRAVELING-WIRE ELECTRICAL DISCHARGE MACHINE

[75] Inventor: Kiyoshi Inoue, Tokyo, Japan

[73] Assignee: Inoue-Japax Research Incorporated, Yokohamashi, Japan

[21] Appl. No.: 971,820

[22] Filed: Dec. 21, 1978

[30] Foreign Application Priority Data

Dec. 26, 1977 [JP] Japan ................................. 52-155676
Jan. 5, 1978 [JP] Japan ....................................... 53-30

[51] Int. Cl.³ .............................................. B23P 1/08
[52] U.S. Cl. ................................................. 219/69 W
[58] Field of Search .......................... 219/69 W, 69 M

[56] References Cited

U.S. PATENT DOCUMENTS 3,928,163  12/1975  Ullmann et al. .................. 219/69 W
3,987,270  10/1976  Ullmann et al. .................. 219/69 W Primary Examiner—B. A. Reynolds
Assistant Examiner—Clifford C. Shaw
Attorney, Agent, or Firm—Karl F. Ross

[57] ABSTRACT

A traveling-wire electrical machining system with improved accuracy results by providing, in addition to the usual electrode guide arms straddling the workpiece and by which the electrode is sharply deflected in its path from the supply coil to the backup coil, a second pair of arms guiding the stretch of the electrode immediately forming the machining region. According to the invention, the second pair of arms, also straddling the workpiece, engages the electrode between each deflection location and the workpiece. The second pair of arms is mounted on the column independently of the first pair of arms so that the second arms are not affected by deflection of the first arms.

5 Claims, 9 Drawing Figures

TRAVELING-WIRE ELECTRICAL DISCHARGE MACHINE

FIELD OF THE INVENTION

The present invention relates to a traveling-wire electrical discharge machine and, more particularly, to an improved wire transport structure or mechanism therefor which assures an increased machining accuracy.

BACKGROUND OF THE INVENTION

In traveling-wire electrical discharge machining (TW-EDM), a thin, continuous wire-like elongate electrode is axially caused to travel or is transported from a supply reel to a wind-up (take-up) reel and a workpiece is disposed in juxtaposition with the traveling-wire electrode while electrical energy in the form of time-spaced electrical pulses is supplied across a machining gap formed between the traveling wire and the workpiece in the presence of a dielectric fluid to effect a series of electrical discharges to remove material from the workpiece. As material removal proceeds, the workpiece is displaced relative to the axially transported wire electrode in a prescribed path to produce a desired cutting pattern in the workpiece.

Conventional machines designed to excute the TW-EDM process are provided with a pair of support arms extending from a column mounted upright on a base of the machine, one of the support arms guiding the continuous wire electrode unwound from the supply reel into the machining region where the workpiece machining portion is located while the other guides the wire electrode having undergone the machining action continuously to the take-up reel. The axial transportation of the wire electrode is effected by controlled rotary drive comprising feed and brake roller arrangements which also act to stretch the moving wire guided between the support members under a sufficient tension to allow the wire electrode to travel smoothly and precisely in machining position relative to the workpiece. As à result, considerable bending as well as tensile stresses are applied to the wire guiding members.

Since the wire electrode is relatively thin, it is difficult to maintain the tension exerted thereon precisely constant. Thus a change in tension exerted on the wire electrode tends to cause variation in deflection stress on the arms carrying the support members which in turn deviates the latter from the predetermined machining positions relative to the workpiece. There consequently ensue errors in cutting path which seriously affect the machining accuracy and there arises a danger of short-circuiting between the wire electrode and the workpiece which can lead to the interruption of the cutting operation. This problem is even more significant with larger machine having longer support arms.

OBJECT OF THE INVENTION

It is, therefore, the principal object of the present invention to provide a traveling-wire electrical discharge machine with an improved wire-transport structure which renders the machining position of the traveling wire electrode substantially immune from variation in tension exerted on the wire electrode.

SUMMARY OF THE INVENTION

There is provided in accordance with the present invention a traveling-wire electrical discharge machine including a column mounted upright on a machine base, a pair of first arms mounted on said column and having first guide members for supporting an elongate wire-like electrode; means for advancing the elongate electrode unwound from a supply reel wound on a take-up reel past a machining region, said elongate electrode sharply changing its advance directions at said first guide members to align the wire electrode substantially in line with a cutting front in said machining region; a pair of second arms mounted independently of said first arms to said column and having second wire guide members positioned between said first guided members and athwart said machining region to align said wire electrode precisely in line with said cutting front with the machining gap in said machining region.

The invention also provides a wire joining arrangement constituted as part of the machine and adapted, for commencement or recommencement of a cutting operation with the machine after cutting or breakage of the wire electrode, to connect the wire piece leading from the supply reel with the wire piece leading into the take-up reel.

SPECIFIC DESCRIPTION

Figure 1:
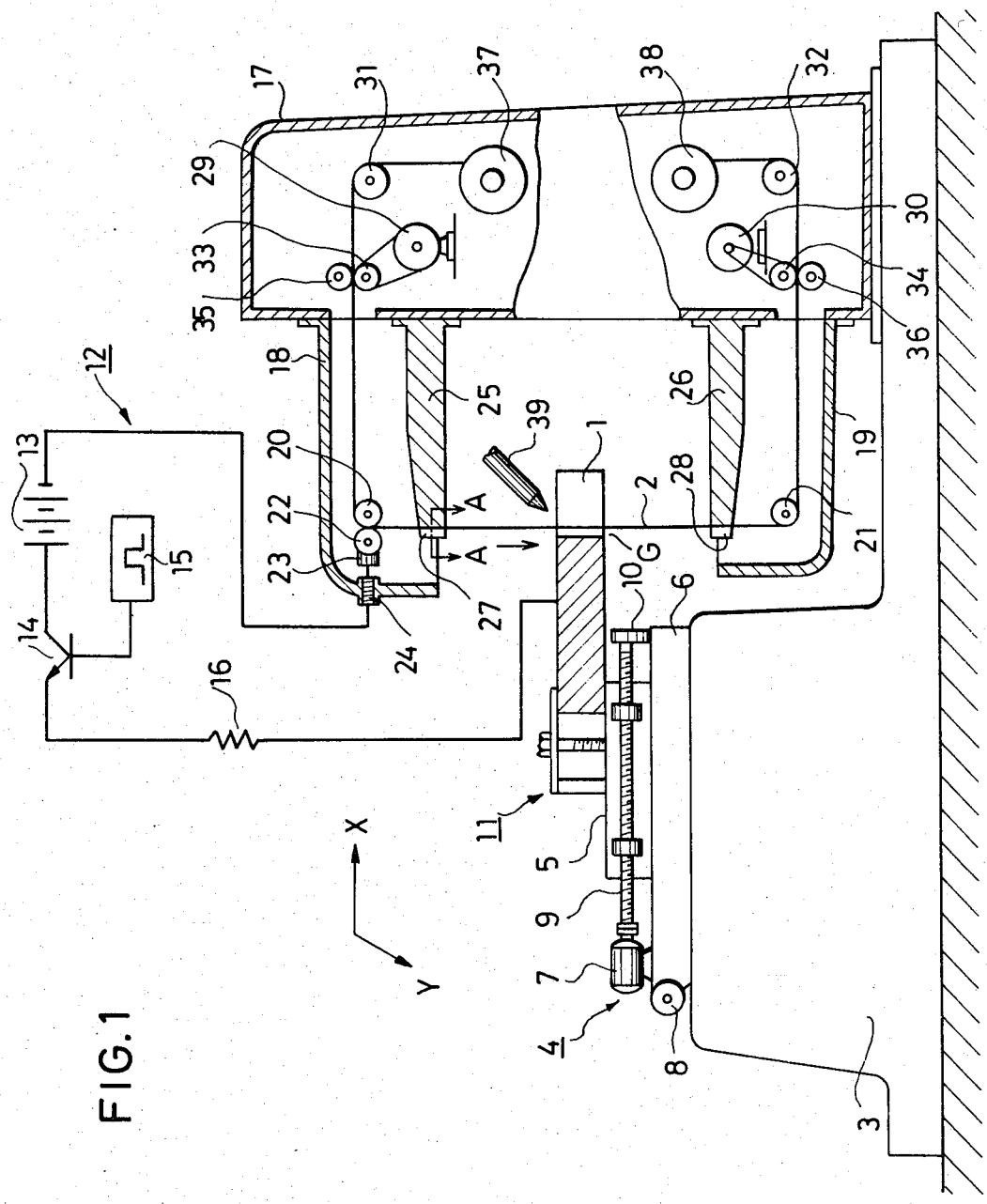
FIG. 1 is a diagrammatic elevational view generally in section and partly schematic illustrating a traveling-wire electrical discharge machining system including a wire-transporting arrangement according to the present invention.

Referring to FIG. 1, the traveling-wire electrical discharge machining system for cutting a workpiece 1 with a wire-like elongate electrode 2 includes a machine base 3 and a carriage 4 mounted thereon for supporting the workpiece 1. The carriage 4 comprises an X-axis feed table 5 and a Y-axis feed table 6 which are displaced in mutually perpendicular directions by X-axis and Y-axis drive pulse motors 7 and 8, respectively, which are driven incrementally by the corresponding command signals from a numerical controller of any well-known configuration (not shown). The X-axis drive motor 7 is shown displacing the X-axis table 5 through a lead screw 9 supported with a plummer block 10 and a similar arrangement couples the Y-axis motor 8 with the Y-axis table 6 as well. The workpiece 1 is shown secured on the table 5 by a clamp unit 11.

A power supply 12 for delivering a machining energy between the workpiece 1 and the wire electrode 2 comprises a DC source 13 connected to the workpiece 1 and the electrode 2 via a switching element 14, shown as a power transistor, which is turned on and off by an oscillator 1, and in series with a resistor 16.

On the machine base 3 there is also provided upright a column 17 which in turn has a pair of arms 18 and 19 mounted thereon having at their respective ends guide members 20 and 21, shown each to be constituted by a roller, for guiding the wire electrode 2 into and out of the region of the workpiece 1. A power-feed roller 22 in bearing relationship with the guide roller 20 to hold the wire electrode 2 therebetween is electrically connected to one terminal of the power supply 12 via a current-conducting brush 23 and a bushing 24 in a usual manner. The elements 22, 23 and 24 as well as the guide member 20 are shown carried by the arm 18 while the guide member 21 is carried by the arm 19.

In accordance with the present invention there are also provided a pair of second arms 25, 26 mounted independently of the first-mentioned arms 18, 19 to the column 17. The arms 25 and 26 carry at their respective end portions second wire-guide members 27 and 28 positioned between the first-mentioned guide members 20 and 21 across the workpiece 1.

The wire electrode 2 is shown transported through the working zone by a pair of motors 29 and 30 which have respectively coupled therewith capstan/pinch roller arrangements 33, 34, 35 36 which lead the wire electrode 2 from a supply reel 37 and onto a take-up reel 38 via guide rollers 31 and 32. The elements 31 through 38 are shown arranged within the column 17.

A fluid supply nozzle 39 delivers a dielectric liquid to the macining gap G formed between the workpiece 1 and the wire electrode 2 transported in juxtaposition therewith.

In operation, a series of electrical pulses are delivered from the power supply 12 between the workpiece 1 and the wire electrode 2 via the conductors 22, 23 and 24 to effect electrical discharges across the machining gap G while the machining fluid, e.g. distilled water, is supplied thereto from the nozzle 39 and the wire electrode 2 is axially transported traveling at a predetermined rate in juxtaposition of the workpiece 1. As material removal proceeds, the carriage 4 displaces the workpiece 1 at a prescribed rate along a given cutting path.

The wire electrode 2 unrolled from the supply reel 37 is caused to change its axial advance direction sharply at the guide member 20 carried by the arm 18 toward the machining region. From the latter region, the wire electrode 2 is again caused to change its advance direction sharply at the guide member 21 extending on the arm 18 so that it can be wound onto the take-up reel 38 via the guide roller 32. As a consequence, considerable bending as well as tensile stress develops at the direction-changing members or rollers 20 and 21 and upon the arms 18 and 19 carrying them respectively. The deflection caused to the arms 18 and 19 deviates the positions of the members 20 and 21 loading the wire electrode 2. Thus, the development of a slight change in tension acting on the wire electrode 2 can result in deviation of the position of the latter relative to the workpiece 1 in the machining region, which would seriously affect the machining accuracy.

This drawback is effectively prevented by the provision of the second arms 25 and 26 between the wire-direction changing arms 18 and 19 across the machining gap G the arms 25, 26 setting the machining position of the wire electrode 2 therein independently of the function of the arms 18 and 19. The arms 25 and 26 to support the wire-positioning guides 27 and 28 are mounted independently of the arms 18 and 19 on the machine column 17 so that the wire-positioning function of the system is substantially completely separated from the wire-guiding function thereof to sharply change its transporting directions which entails the deflection of the wire-transport path. It follows therefore that machining accuracy is assured by the system which allows the transportation of the machining electrode 2 from the supply side 37 to the take-up side 38 through the region of the workpiece 1 with stability and smoothness.

Figure 2:
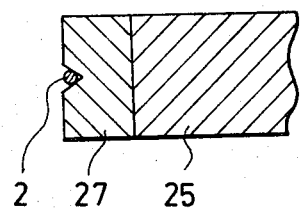
FIG. 2 is an enlarged cross-sectional plan view diagrammatically illustrating a wire-positioning guide member provided at the free end of a wire-support arm, taken along the line A—A in FIG. 1.
Figure 5:
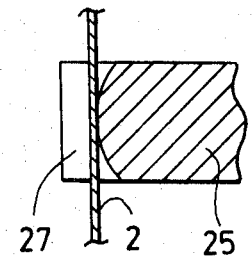
FIG. 5 is an enlarged cross-sectional view diagrammatically illustrating in elevation a wire-positioning section of the arm according to the invention.

The positioning guide members 27 and 28 are each constituted preferably by a chip of wear-resistant material such as cemented carbide, sapphire or diamond attached to the free end of the arm 25, 26 and having a V-shaped recess as shown in FIG. 2 to guide the travelling wire electrode 2. While frictional force develops between the wire electrode 2 and the guiding surface of such chip, this can be reduced to be negligible, for instance, by decreasing the contacting surfaces between them as shown in FIG. 5.

Figure 3:
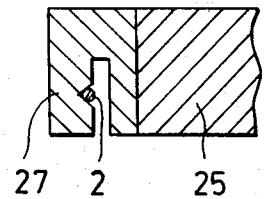
FIGS. 3 and 4 are similar diagrammatic cross-sectional views of modified embodiments of the wire-positioning guide member of the support arm according to the invention.
Figure 4:
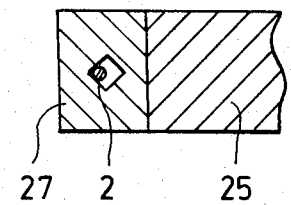

Various modifications of positioning arms 25, 26 and their guide members 27, 28 are possible. For example, one or both of the arms 25 and 26 may be mounted to be vertically displaceable on the column 17. The guide 27 or 28 may be a chip which has a modified angular recess or opening as illustrated in FIGS. 3 and 4 instead of that shown FIG. 2.

Figure 6:
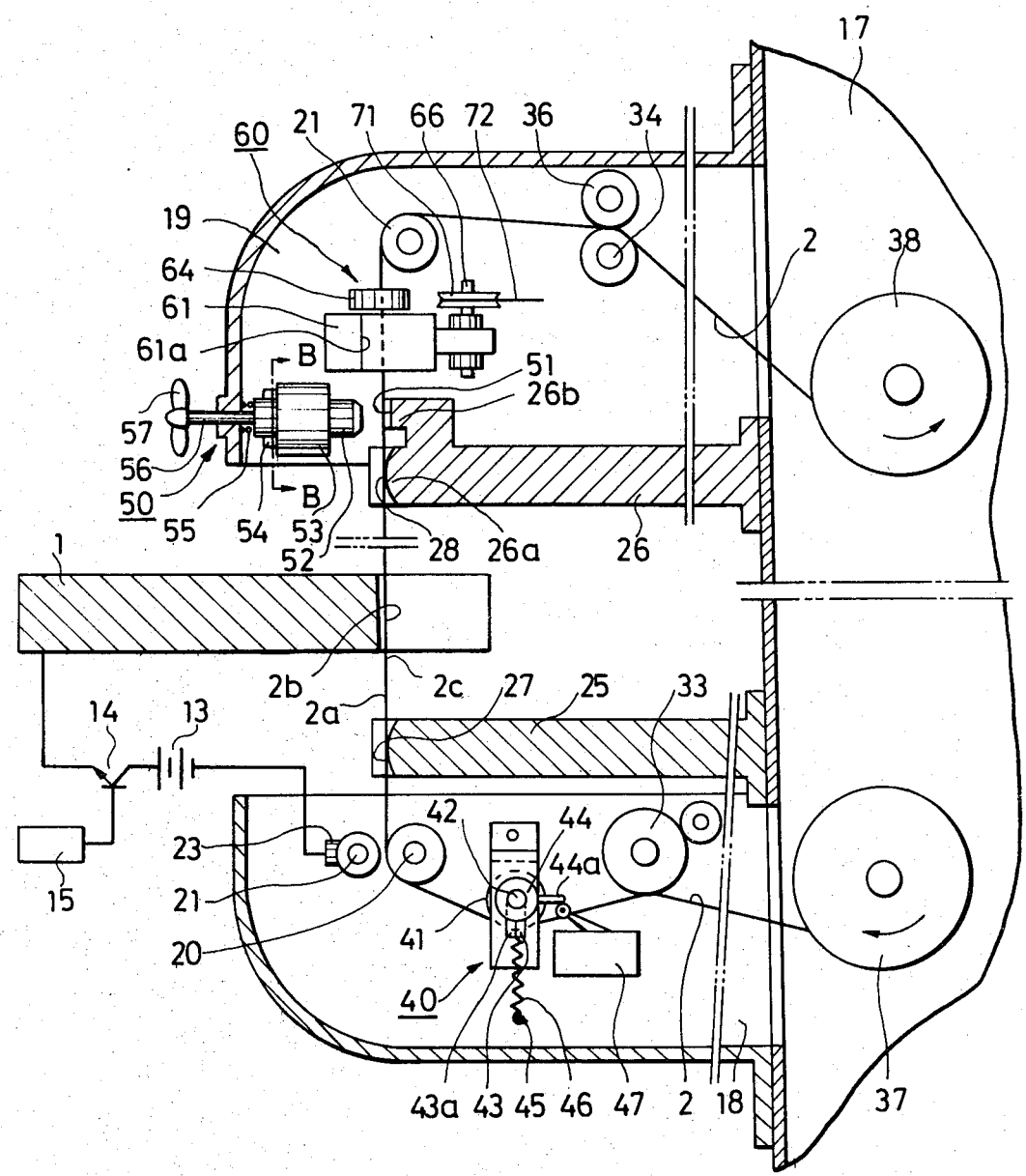
FIG. 6 is an elevational view generally in section diagrammatically illustrating a wire-transporting structure incorporating a wire-joining arrangement according to the invention.

In FIG. 6, there is shown another embodiment of the present invention in which a wire-joining device is associated with a wire-transporting arrangement of the type described with same reference numerals as those in the previous FIGURES designating the same or similar components or elements. In traveling-wire electrical discharge machine, the accidental breakage of the wire electrode in the operating zone is often encountered due to short-circuiting conditions and the cutting of the continuous wire almost always necessary before, during and after a machining operation to bring the wire electrode into and out of engagement with a workpiece. The device illustrated in FIG. 6 is designed to connect the wire piece 2a leading from the supply reel 37 and the wire piece 2b leading to the take-up reel 38 together, the piece resulting from a single-strand wire 2 having been cut at a point 2c.

In this embodiment, the wire electrode 2 unrolled from the supply reel 37 is advanced, as shown through a brake roller 33 and a wire-breakage sensing unit 40, onto a wire-direction changing guide roller 20 carried by the arm 25 and a wire-positioning guide element 27. The wire-breakage sensing unit 40 comprises a tension roller 41 having a shaft 42 whose two ends are journaled in an elongate opening 43a of an F-shaped bracket 43 so as to be displaced vertically. The shaft 42 carries a load ring 44 which is coupled to a fixed point 45 via a load spring 46 under tension so as to be pulled downwardly. A finger 44a projects from the load ring 44 to come into engagement with a limit switch 47.

In machining operation, the wire drive unit comprising a pinch roller 34 and a capstan 36 causes the wire electrode 2 to be advanced against the braking force produced by the brake roller 13 so that the shaft 42 of the tension roller 41 which guides the wire electrode 2 is urged upwardly and thereby held at the upper end in the opening 43a of the bracket 43. When breakage of the wire 2 occurrs in the operating zone, for instance, at a point 2c, the tension roller 41 will instantaneously drop allowing the finger 44a to actuate the limit switch 47, thereby indicating the wire breakage and permitting the machining operation to be interrupted.

Figure 7:
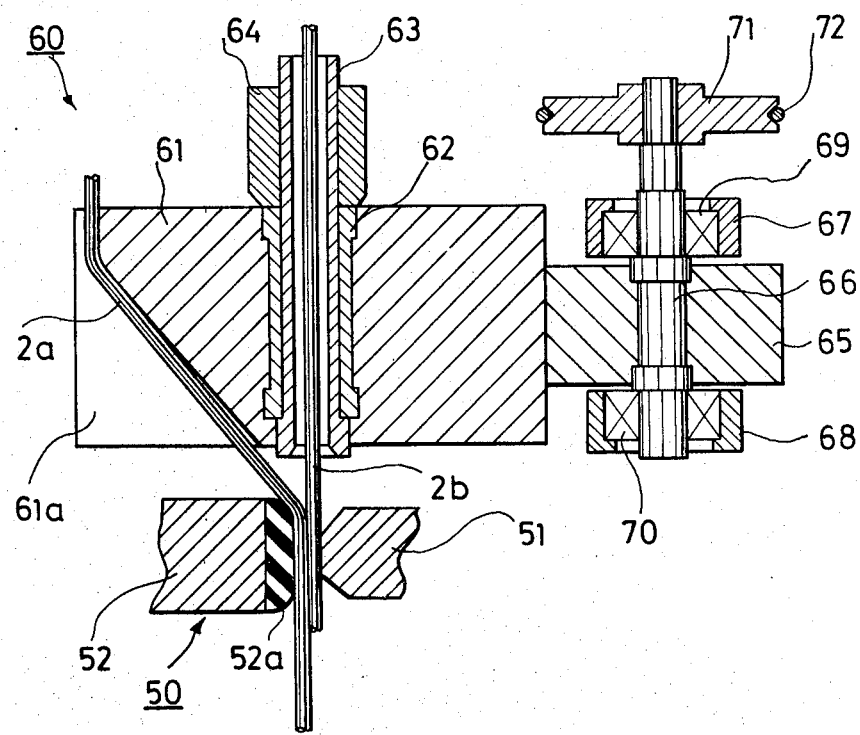
FIG. 7 is an enlarged cross-sectional view of the wire-joining device shown in FIG. 8.

The wire-joining device in this embodiment comprises a wire clipper 50 and a wire-twisting unit 60 both of which are arranged in the wire-transport path between the wire-positioning guide element 28 and the wire-direction changing guide roller 21 on the wire take-up side. The wire-positioning guide element 28 is here provided at one branch end 26a of a bifurcate arm 26 horizontally mounted to the machine column 17 and forms a pair with the other wire-positioning guide element 27 to precisely position the wire electrode 2 in alignment with the cutting front of the workpiece with the machining gap G in the machining region. The other branch end 26b of the bifurcate arm 26 has a chip 51 attached thereon which consitutes an anvil against which the right-side end of a thrust shaft 52 of the unit 50 may be brought into abutment to hold the end portion 2b of the wire 2 cut at the point 2c therebetween. As shown in FIG. 7, the end of the thrust shaft 52 has a hard rubber 52a attached thereto.

Figure 8:
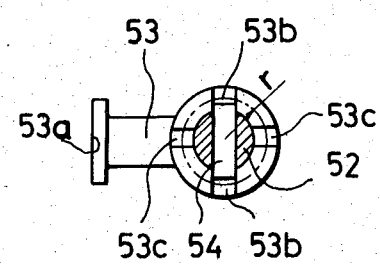
FIG. 8 is an enlarged cross-sectional view taken along the line B—B in FIG. 6.
Figure 9:
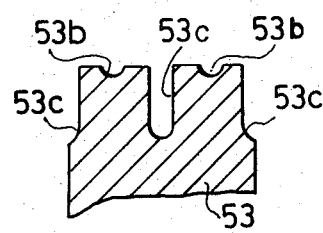
FIG. 9 is a sectional development view of a portion of FIG. 8.

The clipper unit 50 further includes a bracket 53 with its flange portion 53a as shown in FIG. 8 mounted to the wire-guide supporting arm 19 and having the shaft 52 slidably supported in the bracket 53. The shaft 52 has at its left-side end a pin 54 studded therein and the pin 54 is adapted to be engageable with both a shallow groove 53b and a deep groove 53c provided at the left-side end of the bracket 53 as shown in FIG. 8. The thrust shaft 52 under spring pressure by a spring 55 is urged normally in the right direction. In the state shown in FIG. 6, the pin 54 is received in the shallow groove 53b so that the thrust shaft 52 is hung at a position near the leftward running terminal in the drawing. Accordingly, in this state, the end face 52a of the shaft 52 is spaced from the anvil 51 formed on the support arm 26 to allow the wire electrode 2 to pass freely through the space therebetween.

The thrust shaft 52 has at its left end a stem 56 secured thereto with the stem 56 passing through the wall of the covering-like arm member 19 and being provided with a wheel 57 at its left end. Thus, turning the wheel 57 by 90 degrees allows the pin 54 to disengage from the shallow groove 53b and enter the deep groove 53c of the bracket 53 so that the thrust shaft 52 displaces rightward to bring the frictional chip 52a at its right end into abutment against the anvil 51 thereby clipping the wire electrode 2 therebetween.

Assuming that the continuous wire 2 is cut at a point 2c into a pair of one-end open pieces 2d and 2b, the open end portion of these pieces are brought together in the clipper unit 50 just described in the manner being described in connection with FIG. 7.

Referring to FIGS. 6 and 8, the wire-twisting part 60 of the joining device includes a rubber roller 61 having a bushing 62 lined along the wall of its central opening and a fixed shaft 63 supported by a bracket 64 to rotatably carry the roller 61. The roller 61 is in peripheral engagement with a drive wheel 65 for turning therewith. The wheel 65 is carried by a shaft 66 rotatably supported on plummer blocks 67 and 68 via bearings 69 and 70, respectively. The shaft 66 has at its upper end a pulley 71 secured thereto which carries a belt 72. The rubber roller 61 is formed with a cut 61a in which to hold the lower cut piece 2a of the wire electrode 2 is retained.

In a normal operating condition, the wire electrode 2 is allowed to travel from the supply side to the take-up side through the central opening of the tubular shaft 63 without chipping by the unit 50, and the drive wheel 65 and hence the rubber roller 61 are kept standstill.

Once the wire electrode 2 is cut or broken, the end portions of the resulting pieces 2a and 2b are manually brought together, one of which 2a or the piece leading from the supply reel 37 is put in the cut 61a of the rubber roller 61. The drive wheel 65 is rotated by a motor (not shown) through the drive transmission comprising the pulley 71 and the belt 72 carried thereon to turn the rubber roller 61 through frictional force acted between the contacted surfaces of the wheel 65 and the roller 61. The wire piece 2a will then progressively come out from the recess 61a and firmly wind itself round the other wire piece 2b so that the two pieces are reunited.

The arrangement just described thus allows the cut or broken ends of the continuous wire 2 to be joined together with extreme ease and convenience. The joining operation is terminated by halting the turning of the roller 61 and unclipping the wire electrode 2 from the unit 50 to permit a TW-EDM operation to be commenced or recommenced immediately.

This aspect of the present invention admits various modifications as well as regards the clipper 50, the twister 60 and the drive unit. For instance, the roller assembly may be arranged such as to allow the wire piece 2a to be wound shifting upwardly around the wire piece 2b incrementally by one diameter distance for each turn of the roller 61. Also, instead of the rubber roller, the clipper assembly may be turned with the roller standstill.

The wire-joining device described is advantageously utilized in association with the function-separated wire-guide arrangement having separate pairs of guide arms mounted independently of each other from the machine column. Thus, the pair of the direction-changing arms is adapted to carry a predominant portion, say approximately 70%, of the total load imposed on the system while the pair of the positioning arms is adapted to carry only a fraction, say 10 to 20%, of the total load. As described, one of positioning arms may be bifurcate with its first branch serving as a wire-positioning guide section and the second branch serving as part of the wire-joining device which may advantageously be arranged between the wire-positioning guide section and the wire supporting guide section downstream of the machining gap.

There is thus provided an improved traveling-wire electrical discharge machine capable of achieving a machining operation with an increased cutting accuracy and convenience.

I claim:

1. A traveling-wire electrical discharge machine for electroerosively machining a workpiece located in a machining region with a condinuous elongate electrode, said machine comprising: a single column mounted on a machine base; supply reel means mounted on said column for feeding said continuous elongate electrode; takeup reel means mounted on said column for collecting said continuous elongate electrode; a pair of first arms individually mounted to said column and supporting at their respective end portions a pair of first guide sections for spanning said continuous elongate electrode therebetween across said machining region and for guiding said continuous electrode from said supply reel means toward said machining region and for guiding said spanned electrode toward said takeup reel, respectively;

means for advancing said continuous electrode and transporting it through said machining region; a pair of second arms mounted individually to said column and supported independently of said first arms by said single column between said first arms and supporting at their respective end portions a pair of second wire guide sections spacedly positioned between said first wire guide sections across said machining region for guiding said spanned electrode precisely in line with a cutting section across a machining gap in said machining region.

2. The traveling-wire electrical discharge machine defined in claim 1 wherein said first guide sections are positioned to guide said continuous elongate electrode so that its direction of advance changes sharply at each of said first guide sections.

3. The traveling-wire electrical discharge machine defined in claim 2 wherein said first guide sections are positioned to stretch and guide said spanned electrode therebetween generally in alignment with said cutting section across said maching gap in said machining region.

4. The traveling-wire electrical discharge machine as defined in claim 1, claim 2 or claim 3, further comprising a wire-joining device arranged in a path between said supply reel and said take-up reel for uniting a wire-piece leading from said supply reel and a wire-piece leading to said take-up reel together.

5. The traveling-wire electrical discharge machine defined in claim 4 wherein said wire-joining device comprises a wire-twisting member having a central opening for receiving the open end of one of said wire pieces therethrough and a wire-holding section for holding the open end of the other wire piece, said wire-twisting member being rotatably mounted; a wire-clipping member for holding the end of said one wire piece passing through said opening and the open end of the said other wire piece together; and a rotary drive member for rotating said twisting member relative to said clipping member to wind one of said pieces around the other.

* * * * *